United States Patent [19]

Jung et al.

[11] 4,255,389
[45] Mar. 10, 1981

[54] APPARATUS FOR RAPID MACHINE COMPOSTING OF SEWAGE SLUDGE

[75] Inventors: Hermann Jung, Viersen; Günter Spennes, Düren, both of Fed. Rep. of Germany

[73] Assignee: Kutsch-Consult GmbH, Düren, Fed. Rep. of Germany; by said Günter Spennes

[21] Appl. No.: 62,506

[22] Filed: Aug. 1, 1979

Related U.S. Application Data

[60] Continuation of Ser. No. 815,375, Jul. 13, 1977, abandoned, which is a division of Ser. No. 680,369, Apr. 26, 1976, abandoned.

[30] Foreign Application Priority Data

May 2, 1975 [DE] Fed. Rep. of Germany ....... 2519618

[51] Int. Cl.³ .......................... B01J 8/10; C05F 7/00
[52] U.S. Cl. .......................................... 422/209; 71/9;
422/184; 422/233; 422/234; 422/237; 366/220;
414/149
[58] Field of Search .............. 422/184, 209, 210, 232,
422/233, 234, 235, 236, 237; 71/9; 366/187,
220; 210/15; 414/149

[56] References Cited

U.S. PATENT DOCUMENTS

| 2,021,671 | 11/1935 | Skinner | 422/209 X |
|---|---|---|---|
| 2,310,603 | 2/1943 | Taylor | 366/220 X |
| 3,041,157 | 6/1962 | Crane et al. | 71/9 |
| 3,054,663 | 9/1962 | Komline | 422/209 |
| 3,114,622 | 12/1963 | Hardy | 71/9 |
| 3,138,447 | 6/1964 | Eweson | 71/9 |
| 3,357,812 | 12/1967 | Snell | 71/9 |
| 3,689,119 | 9/1972 | Weichel | 414/293 X |
| 3,954,285 | 12/1960 | Carlsson et al. | 71/9 |

FOREIGN PATENT DOCUMENTS

| 1162302 | 2/1964 | Fed. Rep. of Germany | 422/184 |
|---|---|---|---|
| 47456 | 6/1939 | Netherlands | 422/209 |

*Primary Examiner*—Frank W. Lutter
*Assistant Examiner*—Roger F. Phillips
*Attorney, Agent, or Firm*—Finnegan, Henderson, Farabow, Garrett & Dunner

[57] ABSTRACT

A device for the rapid machine composting of sewage sludge including a rotary drum and having a feeding device extending longitudinally of the drum for feeding material to be composted into the drum. Air, heat and moisture are supplied to and discharged from the sludge compost and the composted material is discharged from the drum. A pre-mixing device for the sludge to be composted is located outside the rotary drum and includes a mixing vessel. Material to be composted is delivered to the mixing vessel as is composted sludge from the drum.

9 Claims, 10 Drawing Figures

APPARATUS FOR RAPID MACHINE COMPOSTING OF SEWAGE SLUDGE

This is a continuation of application Ser. No. 815,375, filed 7/13/77, now abandoned, which is a division of application Ser. No. 680,369, filed 4/26/76, now abandoned.

FIELD OF THE INVENTION

The invention relates to an apparatus for the rapid machine composting of sewage sludge (if necessary, previously dewatered) and of other liquid, semi-solid or solid waste materials and mixtures thereof.

BACKGROUND OF THE INVENTION

The increasing quantity of sewage sludge from municipal and certain industrial sewage purification plants and the increasing technical and economic difficulties which are faced in eliminating this sludge, on the one hand, and the undisputed need for humus-forming substances in agriculture and areas of special cultivation, on the other hand, make it desirable to recycle the sludge. For this purpose the sewage sludge must be processed to form a usable humus fertilizer which is pure in hygienic terms, chemically harmless and easy to transport and spread. This applies also to all other waste materials suitable for decomposition.

This conversion of sewage sludge into humus fertilizer is best effected by aerobic stabilization and the rotting method which is generally termed composting.

Since practical experience has shown that static and semi-static composting according to the heap-method of composting and tower or silo composting—particularly for sludge alone and basically for all waste materials whose water content is appreciably more than that of the compost—are unsatisfactory both in terms of method and from the technical/economic aspect, new methods are tending to develop in the direction of machine composting, which ensures a very rapid decomposition process. In these methods the conditions required for composting, such as e.g. thorough mixing, ventilation or supply of oxygen, moisture content, temperature regulation, etc. can be better controlled so that composting can be carried out more reliably, more rapidly and considerably more advantageously from the technical/economic aspect.

In previously known sewage sludge composting processes the sludge, whether it be fresh or rotted down, is comminuted and homogenized if necessary before composting, fed into the composting plant and if necessary comminuted again during the composting process or before storage. Particularly when rotting towers of the non-tiered type are used for practising the known methods, there is a great danger of anaerobic zones forming as a result of insufficient mixing and partly for this reason quite considerable quantities of loosening agents have to be added to ensure a relatively slow rotting process.

Moreover, there is also a known method for rapid machine composting comprising a rotary drum for receiving the material to be composted wherein the latter is mixed with the sludge compost, already in optimum rotting condition in the rotary drum, in such a manner that always a smaller quantity of material to be composted is absorbed by a greater quantity of sludge compost, and the resultant mass or compound is kept in motion while maintaining optimum conditions for composting. Very good results have already been obtained with this method. However, it is still of disadvantage in this method that the material to be composted, which is mixed with the sludge compost already in the drum, frequently does not have uniform and optimum quality.

SUMMARY OF THE INVENTION

An object of the invention is to provide a method and apparatus which do not have the disadvantages of the known methods and moreover have other advantages, and in particular to enable a hygienically pure and spreadable humus fertilizer to be obtained in a technically reliable and economical manner irrespective of the quality of the primary material.

The invention provides a method in which a preliminary mixture is formed from the material to be composted and sludge compost taken from the rotary drum, the consistency and structure of the said mixture being such that, upon appropriate introduction thereof into the rotary drum, it may thoroughly and completely mixed with the main part of the sludge compost over the part of the drum length where it is admitted. For this purpose the preliminary mixture is produced outside the rotary drum by pre-mixing the primary material to be composted with sludge compost, returned from the rotary drum for this purpose, in a pre-mixing apparatus arranged outside the drum.

The water content of the material to be composted and of the returned sludge compost and the desired water content of the preliminary mixture are the factors determining the ratio, in terms of quantity, of the recycled sludge compost to the material to be composted. Particularly favourable results may be achieved if this ratio corresponds to the formula:

$$a \times Z + b \times R = (R+Z) \times c$$

where:
- Z = Quantity of material to be composted
- R = Recycled quantity of sludge compost
- a = Dry substance content of the material to be composted in percentage by weight
- b = Dry substance content of the recycled quantity of sludge compost in percentage by weight, and
- c = Dry substance content of the resultant preliminary mixture in percentage by weight.

With the aid of this formula it may for example be calculated that, with a returned sludge compost having a dry substance content of 69%, a material to be composted having been previously dewatered to a dry substance content of 22% and the preliminary mixture having a desired dry substance content of 60%, the fllowing quantities must be formed with regard to sludge compost and the material to be composted:

$$R = 4.22 \times Z \text{ and } Z = 0.24 \times R.$$

The initial mixture which is formed during pre-mixing of the material to be composted with sludge compost fed back from the rotary drum is then distributed in the drum so as to produce the basic requirements for rapid and reliable decomposition and stabilization.

With the method according to the invention carbon carriers, e.g. sawdust, peat, pulverized brown coal etc., as well as clay components and other improving agents, can also be added to the material to be composted during pre-mixing thereof, besides of the sludge compost fed back from the rotary drum.

Particularly when liquid or semi-liquid primary material is treated, the method according to the invention further provides appropriate measures to convert the primary material into a foam or expanded form in order to assist the mixing action and obtain a more homogeneous and looser mixture. For this purpose, foaming or expanding substances can be added to the material to be composted. This can furthermore be achieved through mechanical treatment of the material to be composted, e.g. by agitating or stirring the latter.

In accordance with a further development of the method of the invention it is further proposed that the movement of the sludge compost in the rotary drum be controlled in such a manner and/or the heat, air and moisture conditions in the drum with regard to the sludge compost be variably regulated in such a manner that biologically and physically differentiated zones are formed in the sludge compost in the drum, the condition of said zones being specifically adapted to meet the respective demands made thereon and the dimensions of said zones being determined according to hygienic, biological, physical and mechanical (in terms of mixing technique) aspects as well as subject to the composting time.

Accordingly, both the method of feeding back sludge compost from the rotary drum and the method of distributing the primary mixture therein are features of the method according to the application. Depending on the method and point of extraction of sludge compost from the drum for the purpose of recycling, the feeding of the primary mixture into the drum, and the draining of sludge compost therefrom, different zones may also be produced in the drum which are subject to variable physical, biological and hygienic conditions or adapted to meet appropriate requirements in each case.

The movement of the sludge compost in the drum is preferably controlled, and/or the heat, air and moisture conditions in the drum with regard to the sludge compost are regulated so that a drying zone, a main composting zone, and a sanitation or purification zone are formed in the sludge compost in the drum.

With regard to sludge compost being fed back from the drum, a further development of the method according to the invention proposes that a uniform return of sludge compost from the drum, which extends over the entire length of the main composting zone, the drying zone, the purification zone, two of these zones or all the zones in the drum, be effected for the purpose of pre-mixing with material to be composted.

The procedure according to a further development of the method of the invention is such that sludge compost is selectively returned from the main composting zone, the drying zone, the purification zone, two of these zones or from all the zones in the rotary drum for pre-mixing with the material to be composted.

Moreover, with the method according to the invention comminuting stages may occur when sludge compost is fed back from the drum, the primary mixture is distributed therein and the finished composted material is removed therefrom.

The apparatus used for putting the method according to the invention into practice may comprise a rotary drum, an apparatus extending in the longitudinal direction of the drum for feeding material to be composted into the drum, arrangements for the feeding and discharge of air, heat and moisture to or from the sludge compost and an arrangement for discharging composted material from the drum.

This apparatus is characterised particularly in that a pre-mixing apparatus is arranged outside the rotary drum, in that means are provided for feeding to the pre-mixer material to be composted from a storage place and for feeding to the pre-mixer sludge compost from the drum, and in that the means for feeding the primary mixture into the drum extends from the pre-mixer into the interior of the drum.

Embodiments of apparatus for carrying out the method according to the invention will now be described, by way of example, with reference to the accompanying diagrammatic drawings.

BRIEF DESCRIPTION OF THE DRAWINGS

Where the various embodiments of apparatus illustrated in the drawings have the same parts, they are provided with the same reference numerals in all the figures.

DETAILED DESCRIPTION OF THE EMBODIMENTS

Figure 1:
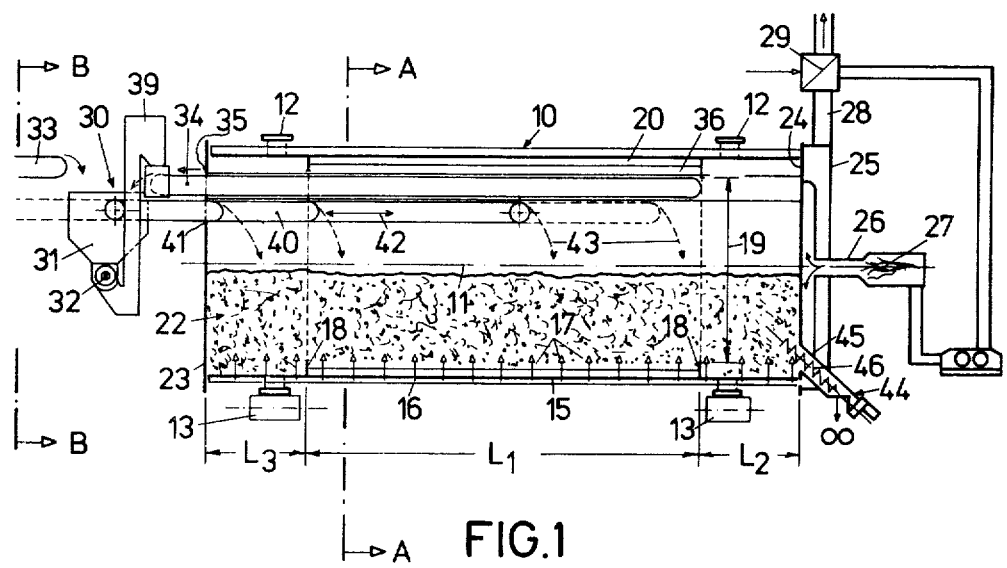
FIG. 1 shows a first embodiment of the apparatus, partly in side elevation and partly in longitudinal section.
Figure 2:
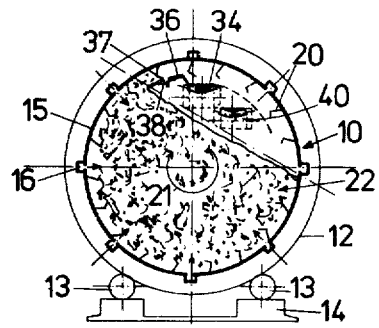
FIG. 2 is a cross section of the apparatus along the lines A—A shown in FIG. 1.
Figure 3:
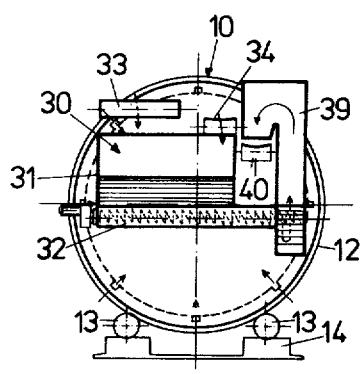
FIG. 3 is an end view of the apparatus along the lines B—B in FIG. 1.

The apparatus shown in FIGS. 1 to 3 comprises an elongated rotary drum 10 horizontally positioned and rotatably mounted about its axis 11. For rotatable mounting, the drum 10 is provided with a rotary ring 12 some distance from each of its ends and extending around the drum circumference. With the aid of these rings 12 the drum 10 is rotatably mounted on two base plates 14 each provided with a pair of rollers 13.

The rotary drum 10 comprises a cylindrical wall 15 as a main component. Arranged on the outer face of this drum wall 15 at regular intervals are ribs 16 of hollow section which extend in the longitudinal direction of the drum wall 15 over its entire length and form channels for feeding and discharging heat, air and moisture into and from the drum 10, respectively. Within each channel section 16 the drum wall 15 also comprises a number of through openings arranged at intervals. In FIG. 1 the passage of heat, moisture or air from one of the channels 16 through the orifices in the drum wall 15 and into the drum 10 is indicated by the arrows 17.

Circular walls 18 are arranged inside the drum 10 regularly spaced from each end of the drum, which walls 18 form partitions to divide the interior of the drum 10 into a drying zone $L_3$, a main composting zone $L_1$ and a purification or sanitation zone $L_2$. The internal diameter 19 of the circular walls 18 is such that the walls 18 allow the sludge compost 22 to flow from one zone to other zones in the drum 10 and there is a space above the sludge compost 22 for connecting all zones for a central discharge of air or steam.

In the vicinity of the main composting zone $L_1$ carrying elements 20 are provided on the inner face of the drum wall 15 for carrying or conveying sludge compost 22 in the direction of the arrow 21 shown in FIG. 2 during rotation of the drum 10. These carrying elements 20 are bucket-like structures which extend in the longitudinal direction of the drum and are spaced at regular intervals from one another.

At the end where the drying zone $L_3$ is located, the rotary drum 10 is closed by a rigidly mounted end wall 23 with which the drum wall 15 and channel or rib sections 16 are sealably connected. The other end of the drum 10 where the purification zone $L_2$ is provided is closed by a likewise rigidly fixed end wall 24. The drum wall 15 and the channel sections 16 are also sealed to this end wall 24.

The outer side of the end wall 24 is connected to a housing 25 provided with channels and connecting pipes for feeding in and extracting heat, moisture and air. The channels are arranged in this housing 25 in such a manner that the medium to be supplied is able to enter the channel sections 16 when the latter are located in the angular section occupied by the sludge compost 22 inside the drum 10 (see FIG. 2). The channels are also arranged in the housing 25 so that the medium to be extracted can pass out through the channel sections 16 when the latter are in the angular section not occupied by the sludge compost 22 when the drum 10 rotates (see FIG. 2).

The housing 25 also comprises a connection 26 for supplying air heated by a burner 27. The housing also comprises a connection 28 for discharging waste air. In the pipe following this connection 28 there is also provided a heat exchanger 29 in which heat exchange takes place between the waste air and fresh air to be supplied to the burner 27.

A pre-mixing apparatus 30 is arranged outside the rotary drum 10, some distance from the drum end wall 23. The pre-mixing apparatus 30 comprises a mixing vessel 31 shaped like a hopper and a worm conveyor and mixer 32 arranged at the bottom end of the vessel, both being horizontally positioned and arranged transversely to the longitudinal axis of the drum 10. A conveyor belt 33 serves to deliver material to be composted to the pre-mixer 30, and a conveyor 34 is provided for feeding sludge compost 22 back to the pre-mixer 30 from the drum 10.

The longitudinally extending conveyor belt 34 is arranged horizontally in the upper area of the interior of the rotary drum 10 above the sludge compost 22 and extends towards the pre-mixer 30 through an opening 35 in the end wall 23 of the drum 10. For loading the conveyor belt 34 there is provided inside the drum 10 a guide plate 36 which, when seen in the direction of drum rotation, is located laterally in front of the conveyor 34 at a slightly greater distance from the inner face of the drum wall 15 than the radial extension of the carrrying elements 20 provided thereon for conveying the compost 22. The length and arrangement of the guide plate 36 corresponds in this case to that of the carriers 20. Consequently the carriers 20 also cause sludge compost 22, coming from the main composting zone $L_1$, to be moved along the guide plate or deflector 36 on to the upper side of the conveyor 34 from which the sludge compost is then delivered to the pre-mixer 30 from the drum 10.

Figure 2A:
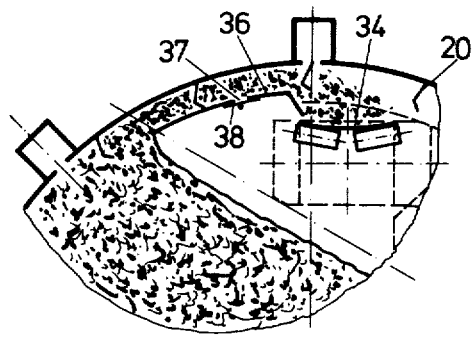
FIG. 2a is an enlarged cross section of parts of the apparatus shown in FIG. 1.

As shown in FIG. 2a, the guide plate 36 comprises in its central section openings 37 which can be fully or partially blocked off by sliding plates 38 provided on their lower sides, thereby providing the facility for regulating the quantity of sludge compost 22 supplied to the conveyor 34.

The primary mixture which is produced in the pre-mixer 30 and consists of fresh material to be composted and fed back sludge compost 22 is fed from the worm conveyor and mixer 32 to a bucket conveyor 39 and from there to a conveyor belt 40 which serves to convey the mixture into the drum 10. The conveyor 40 is arranged horizontally and extends in the longitudinal direction of the drum through a further opening 41 in the end wall 23 and into the drum. The conveyor belt 40 is provided above the sludge compost 22 in the drum 10, parallel to the conveyor 34, but when seen in the direction of drum rotation, to the rear of and below the latter.

The conveyor 40 is designed to be variable in length, which is indicated in FIG. 1 by the double arrow 42. Consequently, with the aid of the conveyor 40 the primary mixture, as shown by the arrows 43 indicated by broken lines in FIG. 1, can be conveyed into the drum 10 at different points. Apart from this it is as a result possible, when conveying the primary mixture into the drum 10 to spread it constantly over a specific zone, such as the zone $L_3$ or $L_1$.

At the end of the drum 10 lying opposite the pre-mixer 30 there is provided an apparatus 44 for discharging the composted material from the interior of the drum 10. This apparatus 44 is arranged in the vicinity of the bottom end of the end wall 24 and the housing 25 which also comprise an appropriate outlet 45. The apparatus 44 comprises a discharge worm 46 by means of which composted material can be discharged from the interior of the drum 10, namely the purification zone $L_2$ thereof.

Figure 4:
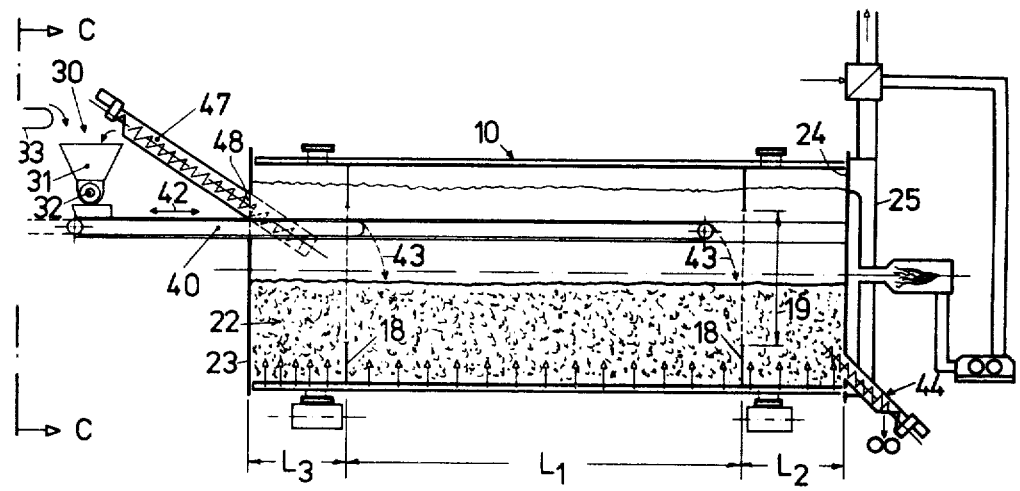
FIG. 4 shows a second embodiment of the apparatus, partly in side elevation and partly in longitudinal section.
Figure 5:
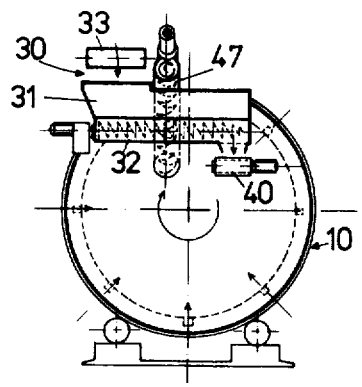
FIG. 5 is an end view of the apparatus along the lines C—C shown in FIG. 4.

With the exception of the apparatus or means for feeding sludge compost 22 back from the drum 10 and a slightly different design and arrangement of the pre-mixer 30, the embodiment of the invention shown in FIGS. 4 and 5 corresponds to the embodiment shown in FIGS. 1 to 3.

In the embodiment of FIGS. 4 and 5 the means for feeding sludge compost 22 back from the drum 10 comprises a worm conveyor 47. This conveyor 47 extends obliquely downwardly into the drum through an opening 48 in the upper section of the end wall 23 of the drum 10. The bottom end of the worm conveyor 47 lies in the upper section of the drying zone $L_3$. Sludge compost 22 is selectively fed back from the inside of the drum 10 by means of the worm conveyor 47 and returned into the pre-mixer 30.

The worm conveyor and mixer 32 of the apparatus 30 conveys the primary mixture, consisting of fresh material to be composted and returned sludge compost 22, directly to the conveyor belt 40 which serves to carry this mixture into the drum 10.

Figure 6:
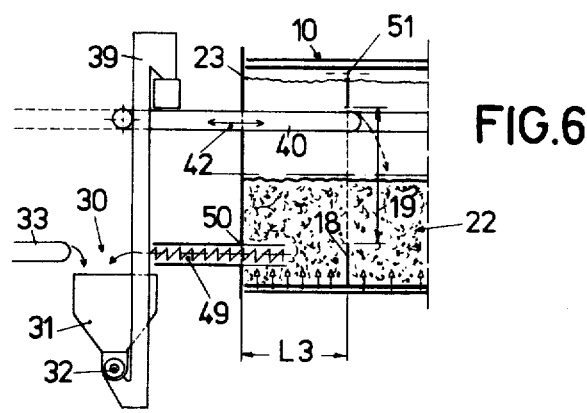
FIG. 6 shows a third embodiment of the apparatus, partly in side elevation and partly in longitudinal section.

The embodiment shown in FIG. 6 largely corresponds to that shown in FIGS. 4 and 5. In this embodiment a worm conveyor 49 is provided for feeding sludge compost 22 back from the drum 10. This conveyor 49 is horizontally arranged and extends inside the drum 10 through an opening 50 in the lower section of the end wall 23. The inner end of this conveyor lies in the bottom part of the drying zone $L_3$. Sludge compost 22 is selectively extracted from the interior of the drum 10 by means of the worm conveyor 49 and fed to the pre-mixer 30.

As in the case of the apparatus shown in FIGS. 1 to 3, the primary mixture in the FIG. 6 embodiment, which mixture consists of fresh material to be composted and returned sludge compost 22, is fed to a bucket conveyor 39 through the worm mixer and conveyor 32 of the pre-mixer 30. The mixture then also passes through this bucket conveyor 39 to a conveyor belt 40 by means of which it can be carried into the interior of the drum 10.

In both the embodiment shown in FIGS. 4 and 5 and the embodiment in FIG. 6, a flow of sludge compost 22 in the longitudinal direction of the drum from the other zones towards zone $L_3$ is formed as a result of the selective extraction of compost 22 from the area of the drying zone $L_3$ inside the drum 10. The formation of this flow can be further assisted by openings 51 at the outer edges of circular walls 18.

Figure 7:
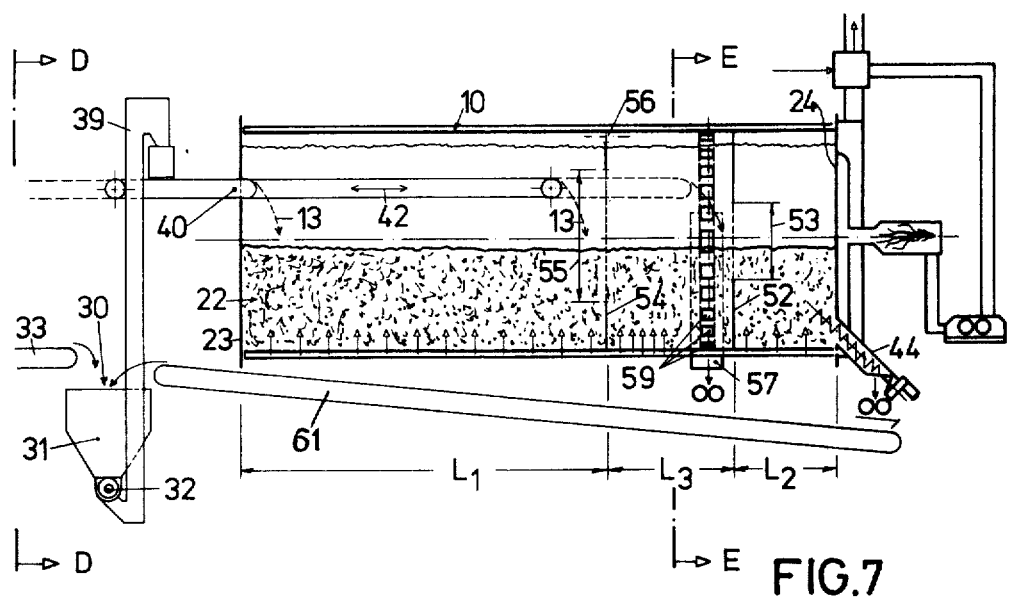
FIG. 7 shows a fourth embodiment of the apparatus, partly in side elevation and partly in longitudinal section.
Figure 8:
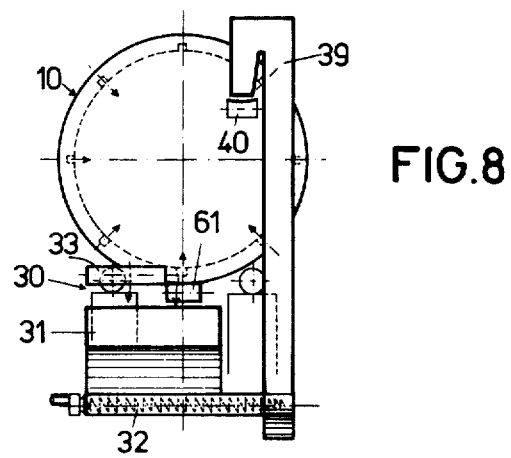
FIG. 8 is an end view of the apparatus along the lines D—D shown in FIG. 7.
Figure 9:
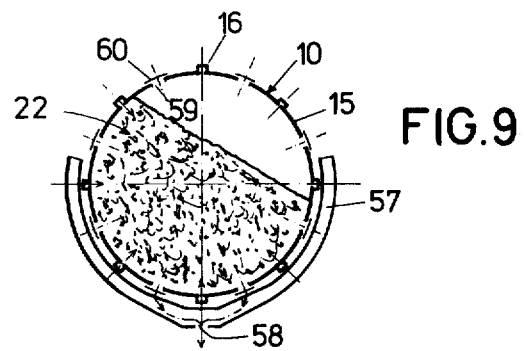
FIG. 9 is a cross section of the apparatus along the lines E—E shown in FIG. 7.

With the exception of a different arrangement of zones in the drum 10 and a different means for feeding sludge compost 22 back from the drum 10, the embodiment shown in FIGS. 7 to 9 corresponds largely to the embodiment shown in FIGS. 1 to 3.

In the embodiment of FIGS. 7 to 9 a circular wall 52 is also provided inside the drum 10 at a certain distance from the end wall 24 of the drum. The circular wall 52 has a substantially smaller internal diameter 53 than the circular walls 18 of the embodiment shown in FIGS. 1 to 3.

A second circular wall 54 is also arranged inside the drum 10, at a distance from the circular wall 52 equal to its distance from the end wall 24. This circular wall 54 has a larger internal diameter 55 than the circular wall 52. Moreover, its outer edge is provided with openings 56.

As a result of the arrangement of the circular walls 52,54 a drying zone $L_3$ is formed inside the drum 10 between the circular walls 52 and 54, a main composting zone $L_1$ between the end wall 23 of the drum 10 and the circular wall 54 as well as a purification zone $L_2$ between the circular wall 52 and the end wall 24 of the drum 10. It is possible, owing to the relatively small internal diameter 53 of the circular wall 52, for sludge compost 22 to flow into and out of the purification zone $L_2$, but that this flow can only take place slowly. On the other hand, the larger internal diameter 53 and the openings 56 in the circular wall 54 result in a flow of sludge compost 22 occurring relatively easily and rapidly between the zones $L_3$ and $L_1$.

An approximately semi-circular drainage channel 57 is provided in this embodiment for draining sludge compost 22 from the interior of the drum 10. The lower half of the drum 10 is enclosed by this drain channel 57, which slightly projects upwards above this half, namely at a point which is located in the drying zone $L_3$ in the vicinity of the circular wall 52. The channel 57 is open on its side facing the drum 10 and its lower end comprises a bottom opening 58. In the vicinity of the channel 57 the drum wall 15 comprises a ring of apertures 59 each of which is located between a pair of channel sections 16. Each aperture 59 is associated with a sliding plate 60 whereby the size of the open part of the aperture 59 can be varied. Sludge compost 22 passes out of the drum 10 through the apertures 59 which are located in the lower half of the drum 10 during rotation thereof, and into the drainage channel 57 and flows down through its bottom opening 58.

A conveyor belt 61 serves to receive the sludge compost 22 flowing out through the bottom opening 58 in the channel 57. It is located below the composting drum 10 and extends diagonally upwards to the pre-mixer 30 from the channel 57 in the longitudinal direction of the drum. The sludge compost 22 drained from inside the drum 10 is therefore also conveyed by the conveyor belt 61 to the pre-mixer 30.

As with the embodiment shown in FIGS. 1 to 3 the primary mixture in the apparatus in FIGS. 7 to 9, which consists of fresh material to be composted and returned sludge compost 22, passes through a bucket conveyor 39 to a conveyor belt 40 and from there can then be conveyed into the drum 10.

The conveyor belt 61 below the drum 10 is designed in such a manner that it extends beyond the drain channel 57 and as far as below the apparatus 44 for extracting composted material from the drum interior. This makes it possible for composted material coming from the purification zone $L_2$ to be also used for the pre-mixing of the fresh material to be composted.

With both the embodiment of FIGS. 7 to 9 and the embodiment shown in FIGS. 1 to 3, it is possible moreover to use the conveyor belt 61 or 34 to deliver finished composted material not to the pre-mixer 30, but to its actual intended destination.

While all embodiments of the apparatus shown in the drawings are suitable for use in large plants, the plants shown in the drawings, particularly that shown in FIGS. 7 to 9, are also suitable for use in smaller plants, in contrast to the embodiment in FIGS. 1 to 3, and therefore in those plants where the drum 10 has a relatively small diameter.

In all embodiments of the apparatus the provision of the purification zone $L_2$ in the drum 10 has great importance in the method in the event of such a zone being required for the purification or stabilization of the sludge compost 22 in the drum 10. The desired biological/physical conditions can be created in the drum 10 by not distributing the material to be composted in the purification zone $L_2$ and largely excluding this zone when returning sludge compost 22 from the drum to the pre-mixer. If necessary, the purification or stabilization of the sludge compost 22 which occurs in this zone can obviate the necessity for the preceding pasteurization of the sludge which may otherwise have been required. In all embodiments importance is attached in practice also to the drying zone $L_3$. Thus special and particularly good biological and physical conditions for feeding sludge compost 22 back from this zone can be created by not distributing the primary mixture in this zone.

The biological and physical conditions occurring in the individual zones depend on a number of influencing factors and may therefore also be controlled thereby. Apart from the distribution of the primary mixture inside the drum 10 and the return of sludge compost 22 therefrom, these are the feeding and discharge of heat, air and moisture to and from the sludge compost 22 in the drum 10. The dimensions of the individual zones are moreover determined by the desired or necessary biological and physical conditions as well as by limiting values, decomposing times, returned quantities of compost and other influencing factors.

With all the illustrated embodiments of the apparatus the organic components to be stabilized and composted of the sewage sludge and other waste materials which are to be processed, whatever the consistency, can be made accessible to the micro-organisms of the sludge compost 22 in the drum 10 under optimum conditions. In most plants basic conditions which are entirely different with respect to the sludge composition and the selected sludge dewatering plant will naturally be given for the pre-mixing of the sludge to be composted with the sludge compost 22. Now however the water contents of the various media are important not only to the biological composting process, but also to the practicability of the mechanical and physical cycles. Where the water content is ideal in biological terms physical/mechanical difficulties are from experience very great since biologically favourable water contents have been found to be different from those which favour mixing. As a result of its variable content of mineral and organic substances and the differing compositions thereof, almost any type of sludge has its own physical laws. The critical points or the most favourable points of the water contents may therefore be different in each case.

A variable mode of operation is therefore also necessary depending on the various functions (water contents from the biological aspect and water contents from the aspect of mixing technique), which may be easily achieved with the apparatus.

Moreover, with all embodiments of the apparatus it is possible to control specifically the composting process depending on the primary material to be composted and to establish optimum composting conditions. The basic conditions are thus created for the reliable and economic operation of plants in which the method and apparatus according to the invention are used.

We claim:

1. An apparatus for the rapid machine composting of sewage sludge including a composting drum rotatable about a substantially horizontal axis and comprising:
   (a) premixing means located outside said drum and including a mixing vessel, means for continuously delivering material to be composted to said mixing vessel;
   (b) means for feeding composted sludge from said drum back to said mixing vessel including a plurality of radially extending carrier elements disposed around the inner face of said drum for moving composted sludge in the direction of rotation of said drum, a guide plate disposed adjacent the top of said drum and spaced from the inner surface thereof and cooperating with said carrier elements to catch the moving composted sludge, and a conveyor belt positioned inside said drum and extending longitudinally in the upper section of said drum interior above the level of the sludge compost and below said guide plate, said conveyor belt adapted to deliver composted sludge to said mixing vessel;
   (c) a variable length conveyor adapted to receive sludge from said mixing vessel and extending longitudinally into the interior of said drum above the level of the sludge compost and operable to continuously feed sludge from said mixing vessel into said drum;
   (d) means for supplying and discharging air, heat, and moisture to and from the sludge compost inside said drum; and
   (e) means independent of said feeding means for continuously discharging composted material from said drum.

2. An apparatus as claimed in claim 1, said guide plate formed with openings aligned with said conveyor belt, and slide plates cooperable with said openings and movable to vary the quantity of sludge passing through said openings.

3. An apparatus as claimed in claim 1, said guide plate being adjustable in the direction of the drum circumference to vary the quantity of sludge delivered to said conveyor belt.

4. An apparatus for the rapid machine composting of sewage sludge including a composting drum rotatable about a substantially horizontal axis and comprising:
   (a) premixing means located outside said drum and including a mixing vessel, means for continuously delivering material to be composted to said mixing vessel;
   (b) means for feeding composted sludge from said drum back to said mixing vessel including a substantially semi-circular drainage channel encompassing slightly more than the lower half of said drum, said channel being open on its side facing said drum and having an opening at its lower end, said drum having a plurality of spaced openings through its circumferential wall and aligned with said drainage channel, said openings permitting composted sludge to flow out of said drum into said channel, and a belt conveyor aligned with said channel opening and adapted to deliver composted sludge to said mixing vessel;
   (c) a variable length conveyor adapted to receive sludge from said mixing vessel and extending longitudinally into the interior of said drum above the level of the sludge compost and operable to continuously feed sludge from said mixing vessel into said drum;
   (d) means for supplying and discharging air, heat and moisture to and from the sludge compost inside said drum; and
   (e) means independent of said feeding means for continuously discharging composted material from said drum.

5. An apparatus as claimed in claim 4 in which the openings in said drum are of variable size.

6. An apparatus for the rapid machine composting of sewage sludge including a composting drum rotatable about a substantially horizontal axis and comprising:
   (a) premixing means located outside said drum and including a mixing vessel, means for continuously delivering material to be composted to said mixing vessel;
   (b) means for feeding composted sludge from said drum back to said mixing vessel including a worm conveyor extending into said drum and adapted to deliver composted sludge to said mixing vessel;
   (c) a variable length conveyor adapted to receive sludge from said mixing vessel and extending longitudinally into the interior of said drum above the level of the sludge compost and operable to continuously feed sludge from said mixing vessel into said drum;
   (d) means for supplying and discharging air, heat, and moisture to and from the sludge compost inside said drum; and (e) means independent of said feeding means for continuously discharging composted material from said drum.

7. An apparatus for the rapid machine composting of sewage sludge including a rotary composting drum and comprising:
(a) premixing means located outside said drum and including a mixing vessel, means for continuously delivering material to be composted to said mixing vessels;
(b) means in said drum forming a main composting zone, a drying zone, and a purification zone;
(c) means extending longitudinally into the interior of said drum above the level of sludge compost for continuously feeding the resulting mixture from the mixing vessel into said drum, said continuous feeding means being operable to feed the sludge mixture to selected zones in said drum;
(d) means of supplying and discharging air, heat and moisture to and from the sludge compost inside said drum;
(e) means for continuously feeding composted sludge from said drum back into said mixing vessel, said continuous feed means being operable to remove composted sludge from said main composting zone and from said drying zone, or from selected areas thereof; and
(f) means independent of said continuous feed means for continuously discharging composted material from said drum.

8. An apparatus as claimed in claim 7, said drum being provided with partitions around its interior circumference to form said main composting zone, said drying zone, and said purification zone, said partitions having central openings to permit flow of composting sludge from one zone to an adjacent zone, said central openings in said partitions providing a common space connecting all zones for centralizing the discharge of air, heat, and moisture.

9. An apparatus as claimed in claim 8 in which said partitions have openings at their outer edges permitting flow of compost sludge from one zone to an adjacent zone during composting.

* * * * *